(12) United States Patent
Bowland et al.

(10) Patent No.: US 8,505,271 B2
(45) Date of Patent: Aug. 13, 2013

(54) SPLICED FIBER GLASS ROVINGS AND METHODS AND SYSTEMS FOR SPLICING FIBER GLASS ROVINGS

(75) Inventors: Creig Dean Bowland, Shelby, NC (US); Pieter Leegstra, Zuidlaren (NL); Jian Meng, Gastonia, NC (US)

(73) Assignee: PPG Industries Ohio, Inc., Cleveland, OH (US)

( * ) Notice: Subject to any disclaimer, the term of this patent is extended or adjusted under 35 U.S.C. 154(b) by 300 days.

(21) Appl. No.: 12/846,204

(22) Filed: Jul. 29, 2010

(65) Prior Publication Data

US 2011/0027524 A1 Feb. 3, 2011

Related U.S. Application Data

(60) Provisional application No. 61/271,990, filed on Jul. 29, 2009.

(51) Int. Cl.
*D01H 15/00* (2006.01)
(52) U.S. Cl.
USPC .................................. 57/22; 57/202
(58) Field of Classification Search
USPC .............................. 57/22, 23, 202
See application file for complete search history.

(56) References Cited

U.S. PATENT DOCUMENTS

| 1,986,974 | A | * | 1/1935 | Kellogg | 156/158 |
| 3,474,615 | A | | 10/1969 | Irwin et al. | |
| 3,634,972 | A | * | 1/1972 | Illman | 57/202 |
| 3,643,417 | A | | 2/1972 | Irwin | |
| 3,675,407 | A | * | 7/1972 | LaRue | 57/22 |
| 3,751,981 | A | | 8/1973 | Jernigan et al. | |
| 3,867,810 | A | | 2/1975 | Meertens et al. | |
| 3,904,458 | A | * | 9/1975 | Wray | 156/85 |
| 4,201,618 | A | | 5/1980 | Lewis | |
| 4,341,065 | A | * | 7/1982 | Baumgartner et al. | 57/22 |
| 4,397,137 | A | | 8/1983 | Davies et al. | |
| 4,428,992 | A | * | 1/1984 | Street | 428/114 |

(Continued)

FOREIGN PATENT DOCUMENTS

| EP | 0 063 954 | 11/1982 |
| EP | 1 316 523 | 6/2003 |
| WO | WO 90/07134 | 6/1990 |

OTHER PUBLICATIONS

Patent Cooperation Treaty, International Preliminary Report on Patentability, Application No. PCT/US2010/043686, mailed Feb. 9, 2012.

(Continued)

*Primary Examiner* — Shaun R Hurley
(74) *Attorney, Agent, or Firm* — Andrew C. Siminerio

(57) ABSTRACT

The invention relates to spliced fiber glass rovings and systems and methods for splicing rovings. In one embodiment, a method for joining fiber glass rovings comprises overlapping a leading end of a first roving with a trailing end of a second roving to create an overlapped region; pneumatically splicing a portion of the overlapped region to form a spliced region; and applying an adhesive to the spliced region. In one embodiment, a spliced fiber glass roving comprises a spliced region comprising a plurality of glass fibers of a leading end of a first roving intertwined with a plurality of glass fibers of a trailing end of a second roving, wherein the spliced region is between about 1 and 20 centimeters long and has a tensile strength between about 50 and 150% of the first roving prior to splicing.

31 Claims, 1 Drawing Sheet

(56) References Cited

U.S. PATENT DOCUMENTS

| | | | |
|---|---|---|---|
| 4,523,600 A | 6/1985 | Donovan | |
| 4,571,929 A | 2/1986 | Bertrams | |
| 4,573,313 A | 3/1986 | Bertrams | |
| 4,577,458 A | 3/1986 | Garnsworthy | |
| 4,608,816 A | 9/1986 | Bertrams et al. | |
| 4,630,433 A | 12/1986 | Premi | |
| 4,757,676 A | 7/1988 | Clayton | |
| 4,788,814 A | 12/1988 | Crouch et al. | |
| 4,825,630 A | 5/1989 | Czelusniak, Jr. et al. | |
| 4,833,872 A | 5/1989 | Czelusniak, Jr. et al. | |
| 4,936,084 A | 6/1990 | Matsui et al. | |
| 4,947,635 A * | 8/1990 | Speranzin et al. | 57/202 |
| 5,042,902 A | 8/1991 | Huebscher et al. | |
| 5,167,111 A | 12/1992 | Cottenceau et al. | |
| 5,560,377 A | 10/1996 | Donovan | |
| 5,783,129 A | 7/1998 | Shirai et al. | |
| 5,788,908 A | 8/1998 | Murakami | |
| 5,809,761 A | 9/1998 | Waters | |
| 6,412,262 B2 | 7/2002 | Ragnoli et al. | |
| 6,434,921 B2 | 8/2002 | Premi | |
| 6,572,719 B2 | 6/2003 | Fecko et al. | |
| 6,789,381 B2 | 9/2004 | Irmen et al. | |
| 6,868,660 B2 | 3/2005 | Premi | |
| 7,870,714 B2 * | 1/2011 | Sikula et al. | 57/22 |
| 8,236,127 B2 * | 8/2012 | Tashiro et al. | 156/254 |
| 2001/0036339 A1 | 11/2001 | Morishita et al. | |
| 2002/0080474 A1 | 6/2002 | Ohishi et al. | |
| 2003/0029547 A1 | 2/2003 | Fecko et al. | |
| 2004/0175407 A1 * | 9/2004 | McDaniel | 424/423 |
| 2006/0204195 A1 | 9/2006 | Kurosawa et al. | |
| 2007/0095011 A1 | 5/2007 | Khan et al. | |
| 2009/0139197 A1 | 6/2009 | Sikula et al. | |
| 2010/0230040 A1 * | 9/2010 | Tashiro et al. | 156/244.19 |

OTHER PUBLICATIONS

Patent Cooperation Treaty, International Search Report and Written Opinion, Application No. PCT/US2010/043686, mailed Jan. 5, 2011.

Mesdan, Knotters and Splicers, web page available at http://www.mesdan.com/english/joining.html, as available via the Internet and printed May 27, 2008.

Pentwyn Slicers, GTW Developments Ltd—New Company, web page available at http://www.gtwdevelopments.co.uk/content/Current%20Products/113%20Series/index.asp, as available via the internet and printed Jun. 18, 2009.

* cited by examiner

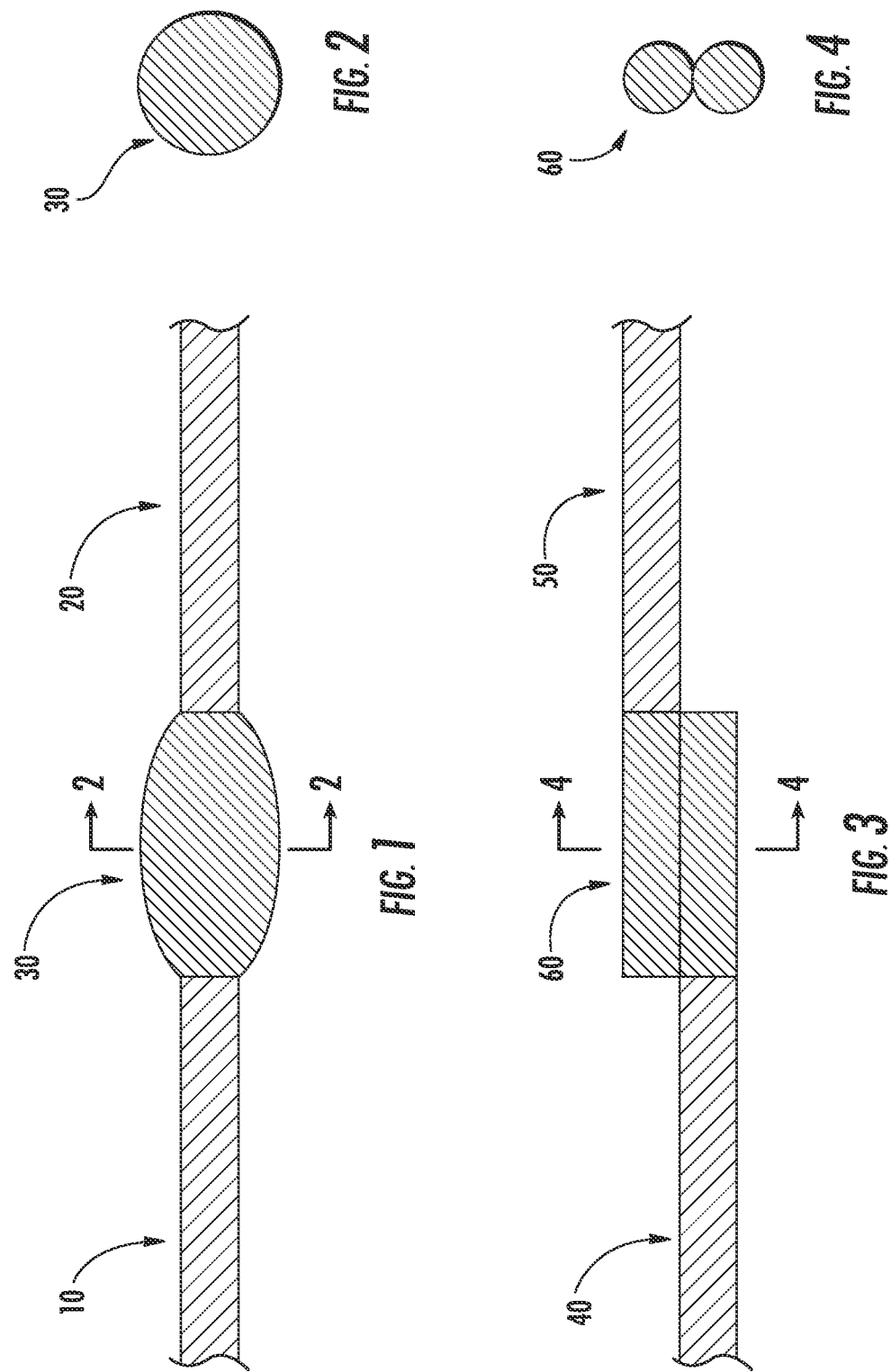

SPLICED FIBER GLASS ROVINGS AND METHODS AND SYSTEMS FOR SPLICING FIBER GLASS ROVINGS

CROSS REFERENCE TO RELATED APPLICATION

This application claims priority to provisional application 61/271,990, filed on Jul. 29, 2009, the entire disclosure of which is incorporated by reference.

FIELD OF INVENTION

The present invention relates to spliced fiber glass rovings and systems and methods for splicing fiber glass rovings.

BACKGROUND

Fiber glass rovings can be used in a number of applications. Typically, fiber glass rovings are provided in a wound package. While a roving in a wound package has a length that is significant, it is often desirable to splice rovings together to create long, quasi-continuous fiber glass rovings for some applications. One existing technique for joining fiber glass rovings is air entanglement splicing. This technique intersperses and tangles the individual fibers of the rovings by forcing high-pressure air over the ends to be joined. A number of commercial devices, often called "air splicers" or "pneumatic splicers," may be used to splice rovings.

In recent years, manufacturing techniques have been developed to produce thermoplastic resins reinforced with long glass fibers. Processes such as G-LFT (Granular-Long Fiber Technology) and D-LFT (Direct-Long Fiber Technology) reinforce thermoplastic resins with fibers that maintain a sufficient length to provide products with desirable mechanical properties and durability. Air entanglement splicing of rovings may be generally deficient in some long-fiber technology (LFT) applications. For example, LFT applications that involve elevated temperatures, high viscosities, and/or high tension rates often cause air entanglement splices to fail. In addition, sizing compositions used on fiber glass rovings for LFT applications may reduce friction between the glass filaments and further reduce the effectiveness of air splicing methods, especially at elevated temperatures. For applications placing a high tension on the fibers, splices often must be very long (0.5 to 1 meter). Such long splices must be made manually by trained workers. Even then the process is very laborious and produces splices of inconsistent quality. Another disadvantage of the long splices often used in LFT processes is the production of large amounts of "fuzz" or "loose glass," which is undesirable for many applications. Moreover, if long air splices are not performed properly, the splice may not survive further downstream processes.

In view of the inefficiencies and difficulties encountered with splicing in LFT processes, there is a need for improved splices and methods for splicing fiber glass rovings.

SUMMARY

Some embodiments of the present invention are directed toward improved methods for joining two or more fiber glass rovings. In some embodiments, the present invention provides a method for joining two or more fiber glass rovings comprising overlapping a leading end of a first roving with a trailing end of a second roving to create an overlapped region; pneumatically splicing at least a portion of the overlapped region to form a spliced region; and applying an adhesive to at least one portion of the spliced region.

Other embodiments of the present invention are directed toward an improved spliced fiber glass roving. In some embodiments, the present invention provides a spliced fiber glass roving comprising a first roving comprising a plurality of glass fibers and having a leading end; a second roving comprising a plurality of glass fibers and having a trailing end; and at least one spliced region comprising a plurality of glass fibers of the leading end of the first roving intertwined with a plurality of glass fibers of the trailing end of the second roving, wherein the at least one spliced region is between about 1 and about 10 centimeters in length and has a tensile strength that ranges between about 50 and about 150% of the tensile strength of the first roving prior to splicing.

Still other embodiments of the present invention are directed toward systems for splicing two or more fiber glass rovings. In some embodiments, the present invention provides a system for splicing two or more fiber glass rovings comprising a pneumatic splicer; an adhesive applicator; a source of ultraviolet radiation; and a means of conveying a spliced roving.

BRIEF DESCRIPTION OF THE DRAWINGS

FIG. 1 is a profile view of a spliced roving of the present invention.

FIG. 2 is a cross sectional view of the spliced roving of FIG. 1 taken along the line 2-2 of FIG. 1.

FIG. 3 is a profile view of a spliced roving having a splice with a "stacked" profile.

FIG. 4 is a cross sectional view of the spliced roving of FIG. 3 taken along the line 4-4 of FIG. 3.

DETAILED DESCRIPTION

For the purposes of this specification, unless otherwise indicated, all numbers expressing quantities of substances, processing conditions, and so forth used in the specification are to be understood as being modified in all instances by the term "about." Accordingly, unless indicated to the contrary, the numerical parameters set forth in the following specification are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains errors necessarily resulting from the standard deviation found in applicable testing measurements.

It is further noted that, as used in this specification, the singular forms "a," "an," and "the" include plural referents unless expressly and unequivocally limited to one referent.

As used herein, the term "roving" means a plurality of individual fiber glass filaments and includes both single-end roving and multi-end roving. A single-end roving is a single bundle of continuous filaments combined into a discrete strand. A multi-end roving is made up of a plurality of discrete strands, each strand having a plurality of continuous filaments. The phrase "continuous" as used herein in connection with filaments, strands, or rovings, means that the filaments, strands, or rovings generally have a significant length but should not be understood to mean that the length is perpetual or infinite. In today's commercial manufacturing environment, where continuous strand or roving is supplied from a package or a plurality of packages, the continuous strand or roving typically has a length between about 40,000 and about 160,000 meters, although other lengths can be provided. Also, as used interchangeably herein, the terms "splice" and "splicing" refer to the act of joining at least two fiber glass rovings. In addition, as used herein, the term "splice" can alternatively refer to the spliced region of a spliced roving, as made clear by the context of the term's use.

The present invention is generally useful for joining or splicing together two or more rovings of fiber glass to form a quasi-continuous long strand (or roving) of fiber glass. Persons of ordinary skill in the art will recognize that the present invention can be implemented in the production, assembly, application, and/or use of a number of fiber glass rovings. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. Fiber glass strands or rovings for use in embodiments of the present invention, including the type of sizing or coating composition applied thereto, can be selected using techniques well-known to those of ordinary skill in the art.

The present invention is generally useful for joining or splicing together two or more fiber glass rovings where there is a need to effectively extend the length of one or more rovings so as to form a quasi-continuous roving. The present invention may be useful, for example, in joining or splicing together two or more fiber glass rovings suitable for use in LFT applications. The present invention may also be useful, for example, in joining or splicing together two or more low tex fiber glass rovings suitable for use in thermoset pultrusion applications. Persons of ordinary skill in the art will recognize that the present invention can be used to splice a number of different types of fiber glass rovings. Non-limiting examples of commercial fiber glass rovings that can be spliced by methods of the present invention include PPG's TufRov® 4510, TufRov® 4517, TufRov® 4575, TufRov® 4585, TufRov® 4588, TufRov® 4589, and TufRov® 4599 rovings.

Some embodiments of the present invention relate to improved methods for joining two or more fiber glass rovings. Some embodiments of the present invention also relate to improved spliced fiber glass rovings. Still other embodiments of the present invention relate to systems for splicing two or more fiber glass rovings.

Some embodiments of spliced fiber glass rovings of the present invention can have various properties. For example, some embodiments of spliced fiber glass rovings of the present invention can exhibit tensile strengths between about 50% and about 150% of the tensile strength of one of the joined rovings prior to splicing, in some embodiments.

In some embodiments of the present invention, a method for joining two or more fiber glass rovings comprises overlapping a leading end of a first roving with a trailing end of a second roving to create an overlapped region; pneumatically splicing at least a portion of the overlapped region to form a spliced region; and applying an adhesive to at least one portion of the spliced region. As indicated above, some applications in which fiber glass rovings are used place a high tension on the rovings. Some embodiments of splicing methods of the present invention can be fast and can provide fairly short splices while still maintaining acceptable tensile strengths.

In some embodiments of the present invention, a method for joining two or more fiber glass rovings comprises overlapping a leading end of a first roving with a trailing end of a second roving to create an overlapped region; pneumatically splicing at least a portion of the overlapped region to form a spliced region; and applying an adhesive to at least one portion of the spliced region, wherein the spliced region is at least about 1 centimeter in length. The spliced region can be between about 1 and about 5 centimeters in length in some embodiments. In some embodiments, the splice region is between about 1 and about 10 centimeters, while in other embodiments, it is between about 1 and about 20 centimeters in length. Splicing methods of the present invention can also be useful for forming longer splices. In some embodiments, the spliced region can be up to about 100 centimeters in length, while in other embodiments, the spliced region can be between about 1 and about 100 centimeters in length. Splicing methods of the present invention can be useful for forming splices of virtually any length, so long as the desired splice length is obtainable using pneumatic splicing. A person of ordinary skill in the art understands that different lengths of spliced regions may be desirable for different applications. Factors that may be important in selecting the length of the spliced region include the number and diameter of glass filaments in the rovings to be spliced; the tension the rovings are subjected to; the desired strength of the splice; the cross sectional area and/or volume of the splice; the amount and chemical composition of any sizing compositions or other coatings applied to the filaments and/or strands; the length scales and other conditions associated with downstream processing of spliced rovings (such as passage through an impregnation die, strand coating die, or hot melt impregnation bath, with or without pins or undulating waves, and, where resins are involved, the resin processing temperature, resin viscosity, and the time the splice is exposed to the resin during processing); and other factors. In some embodiments, a majority of the overlapped region can be pneumatically spliced. In other embodiments, substantially all of the overlapped region can be pneumatically spliced.

It should be further noted that, for some applications, it may be undesirable to add adhesive to the entire length of the spliced region in some embodiments of the present invention. In general, the length of a spliced region to which adhesive has been applied may be more rigid than lengths of the spliced region or roving to which adhesive has not been applied, in some embodiments. In some applications in which fiber glass rovings are used, including some LFT applications, rovings may be passed through various bends and/or waves, such as through wave plates in an extruder. When the bends and/or waves include sharp bends, rigid lengths of spliced roving could become brittle and break instead of bending and flowing. Therefore, in some embodiments of the present invention, the length of the spliced region to which to apply adhesive should be chosen based at least in part on the intended application of the roving. In some embodiments of the present invention, the adhesive should be added to only a portion of the length of the spliced region. In some embodiments of the present invention, the adhesive should be added to no greater than about 5 centimeters of the length of the spliced region. In other embodiments of the present invention, the adhesive may be added to a length of the spliced region greater than about 5 centimeters.

In some embodiments of the present invention in which an overlapped region is pneumatically spliced, pneumatically splicing at least a portion of the overlapped region can comprise impinging one or more jets of pressurized air into the at least a portion of the overlapped region. In some additional embodiments, pneumatically splicing at least a portion of the overlapped region can comprise impinging one or more jets of pressurized air into the at least a portion of the overlapped region, thereby intertwining a plurality of glass fibers in the rovings.

Some embodiments of the present invention can exhibit and/or produce a favorable splice shape. This feature of some embodiments will be discussed with reference to the figures. As shown in FIG. 1, in some embodiments of the present invention, a pneumatic splicer can create a splice that intertwines a plurality of fibers of a leading end of a first roving 10 into a "notch" formed in a trailing end of a second roving 20, so that the first roving 10 is "tucked" into the second roving 20, forming a splice 30 having a "tucked" profile. The cross-section of such a splice can be substantially circular, as shown in FIG. 2. This tucked profile contrasts with splice shapes formed by other splicing methods in which two rovings partially overlap, one on top of the other, as shown in FIG. 3. A leading end of a first roving 40 partially overlaps a trailing end of a second roving 50 so as to form a splice 60 having a "stacked" profile. As shown in FIG. 4, the cross section of a splice having a "stacked" profile can substantially resemble the outline of the number 8. For many applications, a "stacked" profile is not desirable. Although a splice having a stacked profile may have a similar total cross-sectional area or total volume as a splice having a tucked profile, when a splice having a stacked profile passes through a die or is subjected to viscous drag in a resin impregnation bath, the shape of the stacked profile is more likely to result in undesirable peeling or other failure of the splice. In some embodiments of the present invention in which an overlapped region of two or more fiber glass rovings are pneumatically spliced, pneumatically splicing at least a portion of the overlapped region can comprise impinging one or more jets of pressurized air into the at least a portion of the overlapped region, thereby intertwining a plurality of glass fibers in the rovings and resulting in a splice having a tucked profile.

Yet another feature of some embodiments of the present invention is the production of a splice having a relatively small cross-sectional area. In some embodiments of the present invention, the splice can have a cross-sectional area at its thickest point of no greater than about 150% of the sum of the cross-sectional areas of the first and second rovings. In some embodiments, the splice can have a cross-sectional area at its thickest point of no greater than about 95% of the sum of the cross-sectional areas of the first and second rovings. In other embodiments, the splice can have a cross-sectional area at its thickest point of no greater than about 85% of the sum of the cross-sectional areas of the first and second rovings. Splices having such cross-sectional areas can be formed using embodiments of methods and systems of the present invention.

Another feature of some embodiments of the present invention is the production of a splice having a relatively small volume. In some embodiments the splice can have a volume no greater than about 150% of the volume of the at least a portion of the overlapped region prior to splicing. In some embodiments, the splice can have a volume no greater than about 95% of the volume of the at least a portion of the overlapped region prior to splicing. In other embodiments, the splice can have a volume no greater than about 85% of the volume of the at least a portion of the overlapped region prior to splicing. Splices having such volumes can be formed using embodiments of methods and systems of the present invention.

Adhesives that can be used in some embodiments of the present invention can have a variety of properties. As noted above, an adhesive can be applied to at least a portion of a spliced region in some embodiments. The viscosity of adhesives can impact the effectiveness of some embodiments. In some embodiments, the adhesive exhibits a viscosity at 25° C. between about 1 and about 100 centipoise. In other embodiments of the present invention, the adhesive exhibits a viscosity at 25° C. between about 1 and about 10 centipoise. In still other embodiments of the present invention, the adhesive exhibits a viscosity at 25° C. between about 1 and about 5 centipoise. In some embodiments of the present invention, the adhesive exhibits a viscosity at 25° C. of about 3 centipoise.

Some embodiments of methods of the present invention in which an adhesive is applied to at least a portion of a spliced region of two or more rovings can further comprise curing the adhesive. Thus, adhesives that can be used in some embodiments comprise curable adhesives. An additional feature of adhesives that can be used in some embodiments of the present invention relates to their ability to cure. Cured adhesives in some embodiments of the present invention can prevent undesirable tackiness of spliced rovings during downstream handling and processing. Adhesives may be cured by any appropriate means known to one of ordinary skill in the art, although some curing mechanisms may be preferable to others. In addition, some individual adhesives may be cured in multiple ways. For example, individual adhesives may be cured by exposure to air, exposure to moisture, exposure to light (e.g., visible or ultraviolet), heating, or combinations thereof. In some embodiments of the present invention, the adhesive comprises a curable adhesive, such as a light-curable adhesive. In other embodiments of the present invention, the adhesive comprises an ultraviolet- (UV-) curable adhesive. In some embodiments of the present invention, the adhesive comprises methylmethacrylate.

Yet another feature of some embodiments of the present invention is the production of spliced rovings that can withstand the high temperatures used in some downstream processes, such as in some LFT applications. In some embodiments, it may be important for an adhesive to withstand high temperatures that might be used in downstream processes. For example, some embodiments comprise an adhesive that can substantially adhere glass fibers together while experiencing temperatures of up to about 450° C. for up to about 200 seconds. In other embodiments of the present invention, the adhesive can substantially adhere glass fibers together while experiencing temperatures between about 140 and about 450° C. for about 2 to about 200 seconds.

The presence of adhesive in a fiber glass roving might be considered a contaminant during the production of products downstream in some applications. For some applications, it may be desirable to limit the amount of such contamination to the single parts per million range, i.e., about 1 to about 10 ppm. Thus, in some embodiments in which an adhesive is applied to at least a portion of the spliced region, the amount of adhesive used can be important. In some embodiments, about 0.5 grams or less of adhesive can be applied to a spliced region. In other embodiments of the present invention, applying the adhesive to at least one portion of the spliced region can comprise applying about 0.1 grams of the adhesive. In still other embodiments of the present invention, applying the adhesive to at least one portion of the spliced region can comprise applying about 0.01 grams or more of the adhesive.

A number of features of adhesives that can be used in various embodiments of the present invention are described herein. Adhesives having one or more of these features can be used depending on the application. For example, in some embodiments in which an adhesive is applied to at least a portion of a spliced region of two more fiber glass rovings, the adhesive can (i) exhibit a viscosity at 25° C. between about 1 and about 100 centipoise; (ii) comprise a UV-curable adhesive; and (iii) substantially adhere glass fibers together while experiencing temperatures of up to about 450° C. for up to about 200 seconds.

In some embodiments of the present invention, a method for joining two or more fiber glass rovings comprises overlapping a leading end of a first roving with a trailing end of a second roving to create an overlapped region; pneumatically splicing at least a portion of the overlapped region to form a spliced region; applying an adhesive to at least one portion of the spliced region; and trimming the leading end of the first roving and the trailing end of the second roving. In some embodiments, the ends can be trimmed prior to applying the adhesive.

In some embodiments of the present invention, a method for joining two or more fiber glass rovings comprises overlapping a leading end of a first roving with a trailing end of a second roving to create an overlapped region; pneumatically splicing at least a portion of the overlapped region to form a spliced region; applying an adhesive to at least one portion of the spliced region; and curing the adhesive. In some embodiments of the present invention, curing the adhesive comprises irradiating the adhesive with light. In still other embodiments of the present invention, curing the adhesive comprises irradiating the adhesive with ultraviolet (UV) light.

Some embodiments of the present invention relate to spliced rovings having a high tensile strength or can result in spliced rovings have a high tensile strength. In general, the tensile strength of unspliced fiber glass rovings can vary based on the number and thickness of fiber glass filaments in the strands of the rovings; the amount and chemical composition of any sizing compositions or other coatings applied to the filaments and/or strands; the composition of the glass in the filaments and/or strands; and other factors. Unless specified otherwise herein, tensile strength values reported or claimed in this application were determined according to the following procedure. Approximately ten inches of the roving is selected as the gauge length. In the case of spliced rovings, the gauge length is selected so that the splice is centered in the middle of the gauge length. The gauge length is then tested on an Instron test frame that uses a cylindrical clamp to isolate the gauge length from the clamp location. A 1000-pound cell is used as the load cell. The frame is moved at a rate of ten inches per minute. The force required to break the roving is measured by the load cell and recorded using Instron Equipment software. In general, some unspliced fiber glass rovings have a tensile strength of greater than or equal to about 70 $lb_f$, which may be desirable for some applications requiring high tension to be placed on the rovings. Some unspliced fiber glass rovings have a tensile strength of less than about 70 $lb_f$.

In some embodiments of the present invention, a method for joining two or more fiber glass rovings comprises overlapping a leading end of a first roving with a trailing end of a second roving to create an overlapped region; pneumatically splicing at least a portion of the overlapped region to form a spliced region; and applying an adhesive to at least one portion of the spliced region, wherein following application of the adhesive, the spliced region has a tensile strength that is at least about 70 $lb_f$. In other embodiments of the present invention, the spliced region can have a tensile strength that is at least about 80 $lb_f$, at least about 130 $lb_f$, or between about 70 and about 140 $lb_f$ following application of the adhesive. In some embodiments, following application of the adhesive, the spliced region can have a tensile strength that is at least about 50% of the tensile strength of the first roving prior to splicing. The spliced region can have a tensile strength that is at least about 70% of the tensile strength of the first roving prior to splicing in other embodiments following application of the adhesive. In various other embodiments, following application of the adhesive, the tensile strength of the spliced region can be at least about 80% of the tensile strength of the first roving prior to splicing; or at least about 90% of the tensile strength of the first roving prior to splicing; or at least about 120% of the tensile strength of the first roving prior to splicing; or between about 50% and about 150% of the tensile strength of the first roving prior to splicing.

Some embodiments of the present invention relate to spliced fiber glass rovings. In some embodiments of the present invention, a spliced fiber glass roving comprises a first roving comprising a plurality of glass fibers and having a leading end; a second roving comprising a plurality of glass fibers and having a trailing end; and at least one spliced region comprising a plurality of glass fibers of the leading end of the first roving intertwined with a plurality of glass fibers of the trailing end of the second roving, wherein the at least one spliced region is at least about 1 centimeter in length and has a tensile strength that ranges between about 50% and about 150% of the tensile strength of the first roving prior to splicing. In further embodiments, the at least one spliced region can be up to about 20 centimeters in length. In other embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region is at least about 1 centimeter in length and has a tensile strength that ranges between about 50 and about 150% of the tensile strength of the first roving prior to splicing. In further embodiments, the at least one spliced region can be up to about 20 centimeters in length. In still other embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region is at least about 1 centimeter in length; has a tensile strength that ranges between about 50 and about 150% of the tensile strength of the first roving prior to splicing; and has a tucked profile and a cross-sectional area at its thickest point of no greater than about 150% of the sum of the cross-sectional areas of the first and second rovings. In further embodiments, the at least one spliced region can be up to about 20 centimeters in length. In some embodiments, the at least one spliced region has a tucked profile and a cross-sectional area at its thickest point of no greater than about 95% of the sum of the cross-sectional areas of the first and second rovings. In other embodiments, the at least on spliced region has a tucked profile and a cross-sectional area at its thickest point of no greater than about 85% of the sum of the cross-sectional areas of the first and second rovings.

In some embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region is at least about 1 centimeter in length and has a tensile strength that ranges between about 50 and about 150% of the tensile strength of the first roving prior to splicing; and the adhesive (i) exhibits a viscosity at 25° C. between about 1 and about 100 centipoise; (ii) comprises a UV-curable adhesive; and (iii) can substantially adhere glass fibers together while experiencing temperatures of up to about 450° C. for up to about 200 seconds. In further embodiments, the at least one spliced region can be up to about 20 centimeters in length. In other embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region is at least about 1 centimeter in length and has a tensile strength that ranges between about 50 and about 150% of the tensile strength of the first roving prior to splicing; and the adhesive (i) exhibits a viscosity at 25° C. between about 1 and about 100 centipoise; (ii) comprises a UV-curable adhesive; (iii) can substantially adhere glass fibers together while experiencing temperatures of up to about 450° C. for up to about 200 seconds; and (iv) is present in an amount of about 0.5 g or less. In further embodiments, the at least one spliced region can be up to about 20 centimeters in length.

In some embodiments of the present invention, a spliced fiber glass roving comprises a first roving comprising a plurality of glass fibers and having a leading end; a second roving comprising a plurality of glass fibers and having a trailing end; and at least one spliced region comprising a plurality of glass fibers of the leading end of the first roving intertwined with a plurality of glass fibers of the trailing end of the second roving, wherein the at least one spliced region is at least about 1 centimeter in length and has a tensile strength of at least about 70 $lb_f$. In other embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region is at least about 1 centimeter in length and has a tensile strength of at least about 70 $lb_f$.

In still other embodiments of the present invention, a spliced fiber glass roving comprises a first roving comprising a plurality of glass fibers and having a leading end; a second roving comprising a plurality of glass fibers and having a trailing end; at least one spliced region comprising a plurality of glass fibers of the leading end of the first roving intertwined with a plurality of glass fibers of the trailing end of the second roving; and a cured adhesive at least partially securing the at least one spliced region, wherein the at least one spliced region of at least about 1 centimeter in length; has a tensile strength of at least about 70 $lb_f$; and has a tucked profile and a cross-sectional area at its thickest point of no greater than about 150% of the sum of the cross-sectional areas of the first and second rovings. In some embodiments, the at least one spliced region has a tucked profile and a cross-sectional area at its thickest point of no greater than about 95% of the sum of the cross-sectional areas of the first and second rovings. In other embodiments, the at least on spliced region has a tucked profile and a cross-sectional area at its thickest point of no greater than about 85% of the sum of the cross-sectional areas of the first and second rovings. In embodiments of spliced fiber glass rovings incorporating a cured adhesive, the adhesive can possess one or more of the properties specified herein.

Some embodiments of the present invention relate to systems for splicing two or more fiber glass rovings. In some embodiments of the present invention, a system for splicing two or more fiber glass rovings comprises a pneumatic splicer; an adhesive applicator; and a source of ultraviolet (UV) radiation. In some embodiments, the system further comprises a means of conveying a spliced roving. In other embodiments of the present invention, a system for splicing two or more fiber glass rovings comprises a pneumatic splicer; an adhesive applicator; a source of ultraviolet (UV) radiation; and a means of conveying a spliced roving, wherein the system is at least partially automated. The system may be at least partially automated by any appropriate means known to one of ordinary skill in the art. In some embodiments of the present invention, the system may be at least partially automated by the inclusion of a motorized means of conveying a spliced roving. The motorized means of conveying a spliced roving can comprise any appropriate means known to one of ordinary skill in the art. In other embodiments of the present invention, the system may be at least partially automated by the inclusion of an automated splicer. Any appropriate automated splicer known to one of ordinary skill in the art may be used. In some embodiments of the present invention, the system may be at least partially automated by the inclusion of an automatic adhesive applicator. Any appropriate automatic adhesive applicator known to one of ordinary skill in the art may be used. In other embodiments of the present invention, the system may be at least partially automated by the inclusion of an automatic source of ultraviolet (UV) radiation. Any appropriate automatic source of UV radiation known to one of ordinary skill in the art may be used. In some embodiments of the present invention, the system may be at least partially automated by the inclusion of at least one controller that coordinates the steps of the splicing process and/or actuates one or more other components of the system. Any appropriate controller known to one of ordinary skill in the art may be used. In some embodiments of the present invention comprising a system for splicing two or more fiber glass rovings, wherein the system comprises a plurality of components and is at least partially automated, some or all of the plurality of components of the system can be connected to one another mechanically and/or electrically by any appropriate means known to one of ordinary skill in the art.

As noted above certain embodiments of the present invention comprise a pneumatic splicer or pneumatically splicing at least a portion of an overlapped region to form a spliced region. In some embodiments, pneumatic splicing can be performed using a manual air splicer. Any appropriate manual air splicer known to one of ordinary skill in the art may be used. One non-limiting example of a commercially available manual air splicer that can be used in some embodiments is the MESDAN® 110 manual air splicer, commercially available from Mesdan S.p.A. Another non-limiting example of a commercially available manual air splicer is a PENTWYN manual air splicer, commercially available from Pentwyn Splicers or its distributors.

In some embodiments of the present invention, pneumatic splicing can be performed using an automatic air splicer. Any appropriate automatic air splicer known to one of ordinary skill in the art may be used. Non-limiting examples of commercially available automatic air splicers that can be used in some embodiments of the present invention include the MESDAN® 116 automatic air splicer and the MESDAN® 116G automatic air splicer, each commercially available from Mesdan S.p.A.

Some pneumatic splicers that can be used in embodiments of the present invention comprise a splicing chamber. In other embodiments of the present invention, a splicing chamber is not used in the pneumatic splicer. Some pneumatic splicers allow for adjustment of certain properties such as the length of time that air is applied to a region to be spliced, air pressure, and other features. In some embodiments, pressurized air is applied to the splicing region for at least one second. In some embodiments, pressurized air is applied to the splicing region for less than about 10 seconds. In other embodiments, pressurized air is applied to the splicing region for less than about 5 seconds. In some embodiments, an air pressure of 90 psi or greater is used. In other embodiments, an air pressure of less than 90 psi is used. In other embodiments, an air pressure of greater than 100 psi is used. One consideration in selecting an air pressure is minimizing damage to the rovings during splicing. For example, in some embodiments, if the air pressure is too high, excessive damage to the rovings might occur.

As noted above, some embodiments of the present invention comprise an adhesive or applying an adhesive. A number of factors can be important in selecting an adhesive for use in embodiments of the present invention, including, for example, the viscosity of the adhesive, the ingredients of the adhesive, the desired strength of the splice after application of the adhesive, the amount of adhesive to be applied, the desired cure time of the adhesive, the desired manner in which the adhesive should cure, cost, potential employee contact with the adhesive, and other factors. In some embodiments, the adhesive applied to at least one portion of the spliced region is an adhesive selected from the group consisting of: plant and animal starches, natural product resins, animal glues, synthetic and natural rubbers, latexes, polychloroprenes, thermoplastic adhesives, UV-curing adhesives, acrylonitriles, cyanoacrylates, acrylics, epoxy resins, phenolics, amino resins, formaldehyde resins, vinyl ester resins, ethylene-vinyl acetate, phenol formaldehyde resins, polyurethanes, polyamides, polyester resins, unsaturated polyester resins, polyvinyl acetates, polyvinylpyrrolidones, polyethylenes, polysulfides, polypropylenes, polyvinyl chlorides, silicones, and styrene acrylic copolymers. In some embodiments, the adhesive is a fast-curing adhesive. In some embodiments, the adhesive is a UV-curing adhesive. In some embodiments of the present invention, the adhesive is a fast-curing cyanoacrylate adhesive. In other embodiments of the present invention, the adhesive is a UV-curable cyanoacrylate adhesive. One non-limiting example of an adhesive that can be used in some embodiments of the present invention is LOCTITE® 495 Super Bonder Instant Adhesive, commercially available from Henkel Corporation. Other non-limiting examples of adhesives that can be used in some embodiments are LOCTITE® 4306 and LOCTITE® 4307 cyanoacrylate adhesives, commercially available from Henkel Corporation.

In embodiments of the present invention comprising an adhesive or applying an adhesive, the amount of adhesive applied to the spliced region can vary in different embodiments of the present invention. In some embodiments, adhesive can be applied to at least one portion of the spliced region. In some embodiments, adhesive is applied to the leading end of the spliced region. In some embodiments, the amount of adhesive added to the spliced region can be determined based on a number of factors, including, for example, the size of the spliced region to which adhesive is to be applied, the size of the rovings to be joined, the desired tensile strength of the spliced region, the type of adhesive used, and other factors. In some embodiments, a single drop of adhesive can be applied, while in other embodiments, multiple drops can be applied. The presence of adhesive in a fiber glass roving might be considered a contaminant during the production of products downstream for some applications. For some applications, it may be desirable to limit the amount of such contamination to the single parts per million range, i.e., about 1 to about 10 ppm.

Most adhesives desirable for use in embodiments of the present invention need to cure following application to the spliced region. The manner and time in which an adhesive cures may vary depending on the type of adhesive used. Some adhesives may cure on their own by allowing them to set. Other adhesives may cure by application of ultraviolet light, visible light, or heat, or in other ways. Some individual adhesives may cure by more than one means. For example, some individual adhesives may be cured by exposure to air, moisture, or light (including sunlight); by heating; or by a combination of these means. In some embodiments, it may be desirable for the adhesive to cure relatively quickly. In some embodiments of the present invention, the adhesive can cure in 10 seconds or less. In other embodiments, the adhesive curing time may be greater than 10 seconds.

Some embodiments of the present invention comprise curing an adhesive using ultraviolet radiation. The source of UV radiation can vary in different embodiments, depending on a number of factors, including, for example, the size of the spliced region and other factors. The source of the UV radiation can be any appropriate UV source known to one of ordinary skill in the art. Non-limiting examples of possible UV sources useful in the present invention include UV LEDs and UV lamps. In some embodiments of the present invention comprising a source of UV radiation, the UV source may further comprise a radiation shield positioned on or near the UV source so as to block a portion of the UV radiation, particularly to avoid undesired or premature curing of adhesive. For example, in some embodiments, a shield may be mounted on the side of a UV LED placed near an adhesive applicator so as to prevent radiation from the UV LED from curing adhesive inside the applicator before it has been dispensed.

The time required to carry out splicing methods of the present invention can vary in different embodiments of the present invention depending, for example, on the type of equipment used, the type of adhesive used, the arrangement of the equipment, operator involvement, and other factors. In some embodiments, the total time to create the splice and permit the adhesive to cure may be less than 20 seconds. In other embodiments, the total time to create the splice and permit the adhesive to cure may be greater than 20 seconds.

EXAMPLES

Some exemplary embodiments of the present invention will now be described in the following non-limiting specific examples.

Example 1

Procedure Using an Automatic Air Splicer

One example of an embodiment of the present invention is as follows. This procedure might be used, for example, to join the tail end of one package of PPG's TufRov® 4575 single end roving to the leading end of a second package of PPG's TufRov® 4575 single end roving.

First, an automatic air splicer, such as the MESDAN® 116 or MESDAN® 116G, is used to create a splice of two or more fiber glass rovings. In this example, the automatic air splicer includes the 107 m chamber, although other chambers could be used in other embodiments. The splicer is set to 3 and 3 for tail cutting and to 3 for splice time length in this example, although other settings might be more desirable in other embodiments. Air pressure can be set at 90 to 100 psi in this example, although other air pressures can be used in other embodiments. The largest size air lines are used in this example. In other embodiments, smaller sized air lines can be used.

A single drop of adhesive is added to the leading edge of the splice. The adhesive can help keep the leading edge from peeling back in downstream processes, such as an LFT application. In some embodiments, addition of adhesive can also increase the tensile strength of the splice. In this example, the adhesive used is LOCTITE® 495 Super Bonder Instant Adhesive, which is an ethyl cyanoacrylate "super glue." Approximately, 0.1 gram of adhesive is applied in this example.

After the adhesive has been added to the spliced region, the adhesive is worked into the splice if necessary. In this example, an operator's index finger and thumb are used to roll the adhesive into the splice. In other embodiments, a machine or otherwise automated process can used to roll the adhesive into the splice. In some embodiments, the adhesive can have properties where an operator may not need to work the adhesive into the splice. For example, in some embodiments, a high-flow, low viscosity adhesive can be used that effectively wicks itself into the splice. Examples of such adhesives include, without limitation, are LOCTITE® 4306 and LOCTITE® 4307 cyanoacrylate adhesives commercially available from Henkel Corporation. While such adhesives might wick themselves into the splice, additional mechanical assistance can also be supplied in some embodiments to facilitate the wicking, if desired.

The splice is allowed to dry for 10 seconds. The total time to join the rovings by pneumatic splicing and application of the adhesive ranges from 20 to 25 seconds per splice.

Example 2

Procedure Using a Manual Air Splicer

Another example of an embodiment of the present invention is as follows. This procedure might be used, for example, to join the tail end of one package of PPG's TufRov® 4588 single end roving to the leading end of a second package of PPG's TufRov® 4588 single end roving.

First, a manual air splicer, such as a MESDAN® 110 or a PENTWYN manual splicer, is used along with 90 psi air pressure to create a splice of two or more fiber glass rovings that is about 5 centimeters long. The leading and following tails are then cut from the splice. In general, care should be taken so as to only remove the leading and following tails and to avoid damaging the fibers within the spliced region.

A single drop of adhesive is added to the leading edge of the splice. The adhesive can help keep the leading edge from peeling back in downstream processes, such as an LFT application. In some embodiments, addition of adhesive can also increase the tensile strength of the splice. In this example, the adhesive used is LOCTITE® 495 Super Bonder Instant Adhesive, which is an ethyl cyanoacrylate "super glue."

After the adhesive has been added to the spliced region, the adhesive is worked into the splice, if necessary. In this example, an operator's index finger and thumb are used to roll the adhesive into the splice. In other embodiments, a machine or otherwise automated process can be used to roll the adhesive into the splice, if necessary.

The splice is allowed to dry for 10 seconds. The total time to join the rovings by pneumatic splicing and application of the adhesive ranges from 20 to 25 seconds per splice. In some embodiments, the splice is cured with ultraviolet light or with visible light (e.g., an intense LED). In such embodiments, rather than allowing the adhesive to air dry, the adhesive is cured upon application of the ultraviolet light or visible light. Non-limiting examples of adhesives that cure upon application of ultraviolet light and that can be used in some embodiments of the present invention are LOCTITE® 4306 and LOCTITE® 4307 cyanoacrylate adhesives commercially available from Henkel Corporation.

Example 3

Tensile Strengths Exhibited by Some Spliced Rovings of the Present Invention

The spliced rovings of the present invention described in this example were prepared according to the following procedure. To form a spliced roving of the present invention, a leading end of one package of PPG's TufRov® 4588 single end roving and a tail end of a second package of PPG's TufRov® 4588 single end roving were both placed in a MESDAN® 116G automatic air splicer, overlapping by about 6 cm. The two rovings were then spliced, forming a spliced region of about 0.8 cm. The leading and trailing ends were then trimmed, followed by the application of about 0.01 g of cyanoacrylate adhesive. The adhesive was then cured via irradiation with ultraviolet light for about 4 seconds, resulting in a spliced roving. The foregoing method was used to form 19 spliced rovings of the present invention. For comparison with these rovings, 20 additional spliced rovings of the present invention were prepared in the same manner as above, except without the addition or curing of adhesive. Further, the spliced rovings were also compared to 20 unspliced TufRov® 4588 single end rovings. The tensile strength of each of the 59 rovings was then tested according to the following procedure. Approximately ten inches of the roving was selected as the gauge length. In the case of spliced rovings, the gauge length was selected so that the splice was centered in the middle of the gauge length. The gauge length was then tested on an Instron test frame that used a cylindrical clamp to isolate the gauge length from the clamp location. A 1000-pound cell was used as the load cell. The frame was moved at a rate of ten inches per minute. The force required to break the roving was measured by the load cell and recorded using Instron Equipment software. The results of the tensile strength measurements are presented in Tables 1-3 below. As shown in the Tables, the mean tensile strength exhibited by the spliced rovings prepared without adhesive was 90% of that of the unspliced starting materials, while the mean tensile strength exhibited by the spliced rovings prepared with adhesive was 116% of that of the unspliced starting materials.

TABLE 1

Unspliced TufRov ® 4588 Single End Rovings.

| Sample | Load @ Max (lb$_f$) | Tensile Strain at Maximum Load (%) |
|---|---|---|
| 1 | 55.51 | 1.13 |
| 2 | 128.17 | 2.51 |
| 3 | 93.04 | 2.44 |
| 4 | 97.03 | 1.9 |
| 5 | 80.31 | 1.46 |
| 6 | 114.46 | 1.83 |
| 7 | 28.98 | 0.96 |
| 8 | 43.31 | 1.34 |
| 9 | 69.22 | 2.17 |
| 10 | 30.28 | 1.06 |
| 11 | 53.38 | 1.71 |
| 12 | 66.01 | 1.41 |
| 13 | 58.93 | 2.17 |
| 14 | 68.39 | 1.94 |
| 15 | 47 | 2.08 |
| 16 | 38.73 | 1.92 |
| 17 | 113.25 | 2.16 |
| 18 | 64.22 | 2.03 |
| 19 | 104.83 | 1.7 |
| 20 | 97.78 | 2.03 |
| Mean | 72.64 | 1.8 |
| STDEV | 29.544 | 0.445 |
| COV | 40.67 | 24.75 |

TABLE 2

Spliced TufRov ® 4588 Single End Rovings With No Adhesive Added.

| Sample | Load @ Max (lb$_f$) | Tensile Strain at Maximum Load (%) |
|---|---|---|
| 1 | 31.93 | 1.38 |
| 2 | 56.15 | 1.43 |
| 3 | 82.92 | 1.68 |
| 4 | 82.86 | 1.86 |
| 5 | 64.62 | 1.69 |
| 6 | 74.08 | 1.64 |
| 7 | 98.46 | 1.89 |
| 8 | 99.6 | 2.15 |
| 9 | 61.32 | 1.48 |
| 10 | 79.68 | 1.88 |
| 11 | 48.88 | 1.69 |
| 12 | 62.84 | 1.62 |
| 13 | 75.48 | 1.96 |
| 14 | 52.56 | 1.7 |
| 15 | 110.53 | 2.28 |
| 16 | 71.23 | 2.27 |
| 17 | 29.45 | 2.24 |
| 18 | 27.13 | 2.06 |
| 19 | 36.71 | 1.63 |
| 20 | 62.16 | 1.29 |
| Mean | 65.43 | 1.79 |
| STDEV | 23.602 | 0.299 |
| COV | 36.07 | 16.66 |

TABLE 3

Spliced TufRov ® 4588 Single End Rovings With Adhesive.

| Sample | Load @ Max (lb$_f$) | Tensile Strain at Maximum Load (%) |
|---|---|---|
| 1 | 81.03 | 1.66 |
| 2 | 80.12 | 1.64 |
| 3 | 93.51 | 1.86 |
| 4 | 84.13 | 1.72 |
| 5 | 104.78 | 2.15 |
| 6 | 69.78 | 1.49 |
| 7 | 95.46 | 2.04 |
| 8 | 110.27 | 2.11 |
| 9 | 91.3 | 1.67 |
| 10 | 94.33 | 1.74 |
| 11 | 105.12 | 1.89 |
| 12 | 52.37 | 2.12 |
| 13 | 94.16 | 2.02 |
| 14 | 87.34 | 1.93 |
| 15 | 94.67 | 1.85 |
| 16 | 89.9 | 2.65 |
| 17 | 52.03 | 1.46 |
| 18 | 63.39 | 1.29 |
| 19 | 58.71 | 2.36 |
| 20 | — | — |
| Mean | 84.34 | 1.88 |
| STDEV | 17.517 | 0.328 |
| COV | 20.77 | 17.48 |

Example 4

Tensile Strengths Exhibited by Some Spliced Rovings of the Present Invention

The spliced rovings of the present invention described in this example were prepared according to the following procedure. To form a spliced roving of the present invention, a leading end of one package of PPG's TufRov® 4575 single end roving and a tail end of a second package of PPG's TufRov® 4575 single end roving were both placed in a MESDAN® 116G automatic air splicer, overlapping by about 6 cm. The two rovings were then spliced, forming a spliced region of about 0.8 cm. The leading and trailing ends were then trimmed, followed by the application of about 0.01 g of cyanoacrylate adhesive. The adhesive was then cured via irradiation with ultraviolet light for about 4 seconds, resulting in a spliced roving. The foregoing method was used to form 30 spliced rovings of the present invention. For comparison with these rovings, 30 additional spliced rovings of the present invention were prepared in the same manner as above, except without the addition or curing of adhesive. Further, the spliced rovings were also compared to 30 unspliced TufRov® 4575 single end rovings. The tensile strength of each of the 90 rovings was then tested according to the following procedure. Approximately ten inches of the roving was selected as the gauge length. In the case of spliced rovings, the gauge length was selected so that the splice was centered in the middle of the gauge length. The gauge length was then tested on an Instron test frame that used a cylindrical clamp to isolate the gauge length from the clamp location. A 1000-pound cell was used as the load cell. The frame was moved at a rate of ten inches per minute. The force required to break the roving was measured by the load cell and recorded using Instron Equipment software. The results of the tensile strength measurements are presented in Tables 4-6 below. As shown in the Tables, the mean tensile strength exhibited by the spliced rovings prepared without adhesive was 14% of that of the unspliced starting materials, while the mean tensile strength exhibited by the spliced rovings prepared with adhesive was 55% of that of the unspliced starting materials.

TABLE 4

Unspliced TufRov ® 4575 Single End Rovings.

| Sample | Load @ Max (lb$_f$) | Tensile Strain at Maximum Load (%) |
|---|---|---|
| 1 | 142.71 | 3.31 |
| 2 | 95.23 | 1.87 |
| 3 | 100.34 | 1.68 |
| 4 | 147.66 | 2.35 |
| 5 | 127.91 | 2.09 |
| 6 | 149.47 | 2.36 |
| 7 | 195.34 | 3.57 |
| 8 | 123.81 | 2.05 |
| 9 | 132.13 | 2.18 |
| 10 | 137.35 | 2.29 |
| 11 | 102.81 | 1.89 |
| 12 | 110.75 | 1.74 |
| 13 | 149.29 | 2.53 |
| 14 | 131.32 | 2.04 |
| 15 | 134.62 | 2.23 |
| 16 | 118.32 | 1.97 |
| 17 | 99.87 | 1.72 |
| 18 | 98.63 | 1.69 |
| 19 | 160.33 | 2.65 |
| 20 | 166.6 | 2.88 |
| 21 | 80.31 | 1.61 |
| 22 | 181.24 | 3.12 |
| 23 | 142.15 | 2.18 |
| 24 | 137.86 | 2.24 |
| 25 | 178.39 | 3.19 |
| 26 | 51.34 | 1.18 |
| 27 | 128.24 | 2.06 |
| 28 | 137.78 | 2.28 |
| 29 | 146.79 | 2.34 |
| 30 | 51.92 | 2.03 |
| Mean | 128.683667 | 2.244 |
| STDEV | 33.90027 | 0.540252814 |

TABLE 5

Spliced TufRov ® 4575 Single End Rovings With No Adhesive Added.

| Sample | Load @ Max (lb$_f$) | Tensile Strain at Maximum Load (%) |
|---|---|---|
| 1 | 17.48 | 2.06 |
| 2 | 40.18 | 1.72 |
| 3 | 41.82 | 1.92 |
| 4 | 5.91 | 2.09 |
| 5 | 5.97 | 3.06 |
| 6 | 23.88 | 1.95 |
| 7 | 14.33 | 2.11 |
| 8 | 33.72 | 1.7 |
| 9 | 17.42 | 1.99 |
| 10 | 7.49 | 2.57 |
| 11 | 8.19 | 2.02 |
| 12 | 10.71 | 2.35 |
| 13 | 11 | 2.47 |
| 14 | 29.23 | 1.67 |
| 15 | 7.13 | 2.47 |
| 16 | 5.69 | 3.66 |
| 17 | 16.59 | 2.14 |
| 18 | 32.95 | 1.91 |
| 19 | 11.67 | 3.01 |
| 20 | 21.62 | 1.99 |
| 21 | 16.62 | 1.94 |
| 22 | 13.55 | 2.33 |
| 23 | 12.76 | 1.72 |
| 24 | 10.19 | 2.64 |
| 25 | 9.84 | 3.17 |
| 26 | 22.31 | 2.45 |
| 27 | 15.94 | 2.3 |
| 28 | 31.6 | 1.92 |
| 29 | 19.79 | 2.85 |
| 30 | 29.59 | 1.52 |
| Mean | 18.1723333 | 2.256666667 |
| STDEV | 10.4229183 | 0.504177947 |

TABLE 6

Spliced TufRov ® 4575 Single End Rovings With Adhesive.

| Sample | Load @ Max (lb$_f$) | Tensile Strain at Maximum Load (%) |
|---|---|---|
| 1 | 36.86 | 1.25 |
| 2 | 129.15 | 2.47 |
| 3 | 83.66 | 2.53 |
| 4 | 74.79 | 1.69 |
| 5 | 157.39 | 2.72 |
| 6 | 79.66 | 1.83 |
| 7 | 89.02 | 1.76 |
| 8 | 49.35 | 1.47 |
| 9 | 96.1 | 2.06 |
| 10 | 93.64 | 2.19 |
| 11 | 28.8 | 1.09 |
| 12 | 52.13 | 1.4 |
| 13 | 29.81 | 1.34 |
| 14 | 35.81 | 2.05 |
| 15 | 64.77 | 1.68 |
| 16 | 32.46 | 2.14 |
| 17 | 72.74 | 1.7 |
| 18 | 56.6 | 1.88 |
| 19 | 50.99 | 1.19 |
| 20 | 63.04 | 1.9 |
| 21 | 56.01 | 1.57 |
| 22 | 75.11 | 1.8 |
| 23 | 101.74 | 2.19 |
| 24 | 92.61 | 1.77 |
| 25 | 98.42 | 2.13 |
| 26 | 42.5 | 1.05 |
| 27 | 85.38 | 1.69 |
| 28 | 54.63 | 2.17 |
| 29 | 125.27 | 3.73 |
| 30 | 26.8 | 2.84 |
| Mean | 71.1746667 | 1.909333333 |
| STDEV | 32.1935805 | 0.569778743 |

Example 5

Tensile Strengths Exhibited by Some Spliced Rovings of the Present Invention

The spliced rovings of the present invention described in this example were prepared according to the following procedure. To form a spliced roving of the present invention, a leading end of one package of PPG's TufRov® 4585 single end roving and a tail end of a second package of PPG's TufRov® 4585 single end roving were both placed in a MES-DAN® 116G automatic air splicer, overlapping by about 6 cm. The two rovings were then spliced, forming a spliced region of about 0.8 cm. The leading and trailing ends were then trimmed, followed by the application of about 0.01 g of cyanoacrylate adhesive. The adhesive was then cured via irradiation with ultraviolet light for about 4 seconds, resulting in a spliced roving. The foregoing method was used to form 20 spliced rovings of the present invention. For comparison with these rovings, 20 additional spliced rovings of the present invention were prepared in the same manner as above, except without the addition of adhesive. Further, the spliced rovings were also compared to 20 unspliced TufRov® 4585 single end rovings. The tensile strength of each of the 60 rovings was then tested according to the following procedure. Approximately ten inches of the roving was selected as the gauge length. In the case of spliced rovings, the gauge length was selected so that the splice was centered in the middle of the gauge length. The gauge length was then tested on an Instron test frame that used a cylindrical clamp to isolate the gauge length from the clamp location. A 1000-pound cell was used as the load cell. The frame was moved at a rate of ten inches per minute. The force required to break the roving was measured by the load cell and recorded using Instron Equipment software. The results of the tensile strength measurements are presented in Tables 7-9 below. As shown in the Tables, the mean tensile strength exhibited by the spliced rovings prepared without adhesive was 46% of that of the unspliced starting materials, while the mean tensile strength exhibited by the spliced rovings prepared with adhesive was 74% of that of the unspliced starting materials.

TABLE 7

Unspliced TufRov ® 4585 Single End Rovings.

| Sample | Load @ Max (lb_f) | Tensile Strain at Maximum Load (%) |
|---|---|---|
| 1 | 157.04 | 5.72 |
| 2 | 166.86 | 2.57 |
| 3 | 187.04 | 3.16 |
| 4 | 201.51 | 3.41 |
| 5 | 192.95 | 3.77 |
| 6 | 185.36 | 3.51 |
| 7 | 174.37 | 2.89 |
| 8 | 188.46 | 3.44 |
| 9 | 185.75 | 3.17 |
| 10 | 168.94 | 2.67 |
| 11 | 192.12 | 3.74 |
| 12 | 207.94 | 3.67 |
| 13 | 193.5 | 3.65 |
| 14 | 199.9 | 3.85 |
| 15 | 161.18 | 2.66 |
| 16 | 149.42 | 2.86 |
| 17 | 135.16 | 2.83 |
| 18 | 190.36 | 3.4 |
| 19 | 163.44 | 3.09 |
| 20 | 207.75 | 3.54 |
| Mean | 180.45 | 3.38 |
| STDEV | 20.028 | 0.682 |
| COV | 11.1 | 20.17 |

TABLE 8

Spliced TufRov ® 4585 Single End Rovings With No Adhesive Added.

| Sample | Load @ Max (lb_f) | Tensile Strain at Maximum Load (%) |
|---|---|---|
| 1 | 95.94 | 2.7 |
| 2 | 164.89 | 3.43 |
| 3 | 74.83 | 2.64 |
| 4 | 68.58 | 2.06 |
| 5 | 64.4 | 2.69 |
| 6 | 94.83 | 2.41 |
| 7 | 62.94 | 1.81 |
| 8 | 84.81 | 2.39 |
| 9 | 88.06 | 2.31 |
| 10 | 70.95 | 2.07 |
| 11 | 70.33 | 2.15 |
| 12 | 110.98 | 2.52 |
| 13 | 75.38 | 4.42 |
| 14 | 98.28 | 2.25 |
| 15 | 90.37 | 2.66 |
| 16 | 92.08 | 2.28 |
| 17 | 87.73 | 2.28 |
| 18 | 47.15 | 2.07 |
| 19 | 56.8 | 2.06 |
| 20 | 73.96 | 2.62 |
| Mean | 83.66 | 2.49 |
| STDEV | 24.762 | 0.574 |
| COV | 29.6 | 23.03 |

TABLE 9

Spliced TufRov ® 4585 Single End Rovings With Adhesive.

| Sample | Load @ Max (lb_f) | Tensile Strain at Maximum Load (%) |
|---|---|---|
| 1 | 85.43 | 1.61 |
| 2 | 154.31 | 2.68 |
| 3 | 167 | 2.86 |
| 4 | 80.34 | 1.51 |
| 5 | 157.94 | 4.05 |
| 6 | 144.15 | 2.56 |
| 7 | 105.96 | 1.95 |
| 8 | 148.69 | 2.8 |
| 9 | 109.27 | 2.08 |
| 10 | 135.52 | 2.77 |
| 11 | 85.39 | 1.99 |
| 12 | 134.85 | 2.38 |
| 13 | 90.59 | 1.84 |
| 14 | 177.42 | 3.21 |
| 15 | 183.33 | 3.41 |
| 16 | 117.95 | 2.56 |
| 17 | 173.42 | 3.05 |
| 18 | 153.03 | 2.97 |
| 19 | 151.13 | 2.96 |
| 20 | 107.13 | 1.91 |
| Mean | 133.14 | 2.56 |
| STDEV | 33.065 | 0.65 |
| COV | 24.83 | 25.43 |

Desirable characteristics which can be exhibited by the splicing methods and systems and the spliced rovings of the present invention include, but are not limited to, spliced rovings having tensile strengths that are about 50% to about 150% of that of the individual, native rovings; spliced rovings having a cross-sectional area and/or a volume that is similar to that of the individual, native rovings; spliced rovings that are able to withstand high temperatures; spliced rovings that are capable of withstanding passage through compositions with high or thick viscosities; rapid splicing methods; simple splicing methods; splicing methods that reduce manufactur- That which is claimed:

1. A method for joining two or more fiber glass rovings comprising:
   (a) overlapping a leading end of a first roving with a trailing end of a second roving to create an overlapped region;
   (b) impinging one or more jets of pressurized air into at least a portion of the overlapped region to form a spliced region having a tucked profile; and
   (c) applying an adhesive to at least one portion of the spliced region.

2. The method of claim 1, wherein the spliced region is at least about 1 centimeter in length.

3. The method of claim 1, wherein the spliced region is between about 1 and about 20 centimeters in length.

4. The method of claim 1, wherein the spliced region is between about 1 and about 10 centimeters in length.

5. The method of claim 1, wherein the spliced region is between about 1 and about 5 centimeters in length.

6. The method of claim 1, wherein impinging one or more jets of pressurized air into at least a portion of the overlapped region intertwines a plurality of glass fibers in the rovings.

7. The method of claim 6, wherein impinging one or more jets of pressurized air into at least a portion of the overlapped region results in a splice having a cross-sectional area at its thickest point of no greater than about 150% of the sum of the cross-sectional areas of the first and second rovings.

8. The method of claim 6, wherein impinging one or more jets of pressurized air into at least a portion of the overlapped region results in a splice having a volume no greater than about 150% of the volume of the at least a portion of the overlapped region prior to splicing.

9. The method of claim 1, wherein the adhesive exhibits a viscosity at 25° C. between about 1 and about 100 centipoise.

10. The method of claim 1, wherein the adhesive exhibits a viscosity at 25° C. between about 1 and about 10 centipoise.

11. The method of claim 1, wherein the adhesive exhibits a viscosity at 25° C. between about 1 and about 5 centipoise.

12. The method of claim 1, wherein the adhesive comprises methylmethacrylate.

13. The method of claim 1, wherein the adhesive comprises a curable adhesive.

14. The method of claim 13, wherein the adhesive comprises a UV-curable adhesive.

15. The method of claim 1, wherein the adhesive can substantially adhere glass fibers together while experiencing temperatures of up to about 450° C. for up to about 200 seconds.

16. The method of claim 1, wherein the adhesive can substantially adhere glass fibers together while experiencing temperatures between about 140 and about 450° C. for about 2 to about 200 seconds.

17. The method of claim 1, wherein applying the adhesive to at least one portion of the spliced region comprises applying about 0.5 g or less of the adhesive.

18. The method of claim 1, wherein the adhesive:
   exhibits a viscosity at 25° C. between about 1 and about 100 centipoise;
   (ii) comprises a UV-curable adhesive; and
   (iii) can substantially adhere glass fibers together while experiencing temperatures of up to about 450° C. for up to about 200 seconds.

19. The method of claim 1, further comprising trimming the leading end of the first roving and the trailing end of the second roving.

20. The method of claim 19, wherein the ends are trimmed prior to applying the adhesive.

21. The method of claim 1, further comprising curing the adhesive.

22. The method of claim 21, wherein curing the adhesive comprises irradiating the adhesive with ultraviolet light.

23. The method of claim 1, wherein following application of the adhesive, the spliced region has a tensile strength that is at least about 70% of the tensile strength of the first roving prior to splicing.

24. The method of claim 1, wherein following application of the adhesive, the spliced region has a tensile strength that is at least about 90% of the tensile strength of the first roving prior to splicing.

25. The method of claim 1, wherein following application of the adhesive, the spliced region has a tensile strength that is at least about 120% of the tensile strength of the first roving prior to splicing.

26. The method of claim 1, wherein following application of the adhesive, the spliced region has a tensile strength between about 50 and about 150% of the tensile strength of the first roving prior to splicing.

27. A method for joining two or more fiber glass rovings comprising:
   (a) overlapping a leading end of a first roving with a trailing end of a second roving to create an overlapped region;
   (b) pneumatically splicing at least a portion of the overlapped region to form a spliced region such that the spliced region has a tucked profile; and
   (c) applying an adhesive to at least one portion of the spliced region.

28. The method of claim 27, wherein pneumatically splicing at least a portion of the overlapped region results in a splice having a cross-sectional area at its thickest point of no greater than about 150% of the sum of the cross-sectional areas of the first and second rovings.

29. The method of claim 27, wherein pneumatically splicing at least a portion of the overlapped region results in a splice having a volume no greater than about 150% of the volume of the at least a portion of the overlapped region prior to splicing.

30. The method of claim 27, wherein the adhesive comprises a UV-curable adhesive.

31. The method of claim 27, further comprising curing the adhesive, wherein curing the adhesive comprises exposing the adhesive to air, light, heat, or combinations thereof.

* * * * *